(12) United States Patent
Maurice et al.

(10) Patent No.: US 10,382,255 B1
(45) Date of Patent: Aug. 13, 2019

(54) CUSTOM PROMOTION TIERS (71) Applicant: Amazon Technologies, Inc., Seattle, WA (US)

(72) Inventors: Sandor Loren Maurice, Vancouver (CA); Alexey Kuznetsov, New Westminster (CA); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 15/195,718

(22) Filed: Jun. 28, 2016

(51) Int. Cl.
*H04L 12/24* (2006.01)

(52) U.S. Cl.
CPC ...... *H04L 41/0668* (2013.01); *H04L 41/0806* (2013.01); *H04L 41/0879* (2013.01); *H04L 41/145* (2013.01)

(58) Field of Classification Search
CPC ............... H04L 41/0668; H04L 41/145; H04L 41/0806; H04L 41/0879
See application file for complete search history.

(56) References Cited

U.S. PATENT DOCUMENTS

| | | | | |
|---|---|---|---|---|
| 2009/0031154 A1* | 1/2009 | Ikawa | ................... | G06F 1/3221 713/320 |
| 2015/0109903 A1* | 4/2015 | Nasir | ................... | H04L 41/5074 370/221 |
| 2017/0168907 A1* | 6/2017 | Harper | ................ | G06F 11/2033 |

* cited by examiner

*Primary Examiner* — Michael A Keller
(74) *Attorney, Agent, or Firm* — Davis Wright Tremaine LLP (57) ABSTRACT

A system and method for failover in a distributed system may comprise a computing device that receives information associating computing nodes with ordinal identifiers, such that the computing nodes are divided into at least a first and second subset based on the identifiers. The identifiers may further define an ordering of the subsets. When failover occurs, candidate computing nodes may be identified and selected based at least in part on the ordering. Secondary considerations, including functions performed by other members of a candidate's subset, are considered when identifying candidate nodes.

20 Claims, 8 Drawing Sheets

CUSTOM PROMOTION TIERS

BACKGROUND

Computing clusters and other distributed computing systems may include a number of computing nodes which perform computing functions individually and collectively. In order to provide more reliable service, computing clusters may include both primary and backup nodes. In the event that a primary node fails, a backup node may begin performing functions previously performed by the failed primary node. In some cases, the backup node may operate in a standby mode, such that it is immediately available to assume the role of the primary. For example, data may be continually replicated from a primary node to a backup while the primary is operating normally. In the event that the primary node fails, the backup will have access to most of the data that was available to the primary node. However, there are drawbacks to having nodes in a cluster designated exclusively as backups, such as the backup node being unused except when a primary node fails.

In some cases, a computing service provider may provide customers with access to a computing cluster operated on the customer's behalf. Configuring specific primary and backup nodes may be problematic in such cases. One issue involves the customer's incomplete control over the operation and configuration of the computing nodes that make up the cluster. Over time, both the customer and the provider may, for various reasons, modify the operation and configuration of the cluster. For these and other reasons, conventional, fixed or hard-wired approaches to specifying backup nodes may be less than optimal for service-oriented computing environments.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems, methods, and computer program products pertaining to failover of computing nodes in a distributed computing environment, including environments in which distributed computing capabilities are provided, as a service, to clients of a provider. In various embodiments, associations between computing nodes and ordinal values may be provided by a client. The ordinal values may group the computing nodes into ranked subsets, sometimes referred to herein as tiers, from which candidate nodes may be selected for promotion in the event of a failover. A promoted node, upon failover, may assume the role of the failed node. Computing nodes are generally selected for promotion based on the ranking of the subsets and additional factors controlled by the service provider.

In an example embodiment, a distributed computing system may comprise a plurality of computing nodes. Each of the computing nodes may perform one or more computing functions. For example, some of the plurality might perform write-related computing functions, while some of the plurality might perform read-related functions.

A computing device may be configured to execute the instructions of a failover coordination module. The instructions of the module may be loaded into a memory of the computing device and executed by a processor. Execution of the instructions by the processor may cause the computing device to identify a failed computing node, select a computing node to promote based on the tiers provided by the client and provider criteria, and cause the promoted computing node to assume the role of the failed computing node. The provider criteria may be related to factors such as the available capacity, geographic or network location, and the role(s) already performed by the node that is to be promoted.

The computing device may receive information indicative of an association between a first subset of the computing nodes and a first identifier. The first subset may be defined by the identifiers, such that each computing node is independently associated with an identifier. The first subset may then comprise those nodes which were associated with the first identifier.

The first identifier may, moreover, be indicative of a ranking of the first subset of computing nodes with respect to other subsets. The ranking may pertain to selection of candidates for promotion during a failover.

The computing device may also receive information indicative of an association between a second subset of the computing nodes and a second identifier. The second identifier may be indicative of a lower ordering of the second subset of computing nodes, compared to the first subset, for promotion of its members during a failover.

The computing device may determine to select a computing node for promotion in response to determining that a first computing node should be failed over. The first computing node may, for example, have an unhealthy operating status.

When a second computing node of the first subset is a candidate for promotion, the computing device may cause the second computing node to perform a computing function previously performed by the first computing node. Put another way, the role of the first computing node in performing the computing function may be transferred to the second computing node.

When no computing node of the first subset is a candidate for promotion, the computing device may select a third computing node, of the second subset, for performing the computing function. The selection may be based on the second subset having a lower ordering than the first subset. This ordering, as noted, may be based on the relative values of the first identifier and the second identifier.

More generally, a computing node of the plurality may be selected based on the ordinal position of the identifier associated with a node. In an example, nodes associated with the highest priority identifier (e.g. "0") are selected before nodes of the second highest priority identifier (e.g., "1"), and then the third highest priority, and so forth. If a node associated with a "0" identifier is available, it may typically be promoted before a node associated with a "1" identifier, and so on. In some instances, candidates are selected starting with the same priority as the failing node and proceeding downwards. For example, if a failing node has a priority of "2," candidates are first identified in tier 2, then in tier 3, and so on.

In some instances, the tier definitions are not dispositive in identifying a node for promotion. For example, a tier 1 computing node might normally be a candidate for promotion. However, the tier 1 computing node might nevertheless be excluded as a candidate based on various considerations. These include considerations based on the role performed by the potential candidate, and how performance of that role would be affected by promotion.

Figure 1:
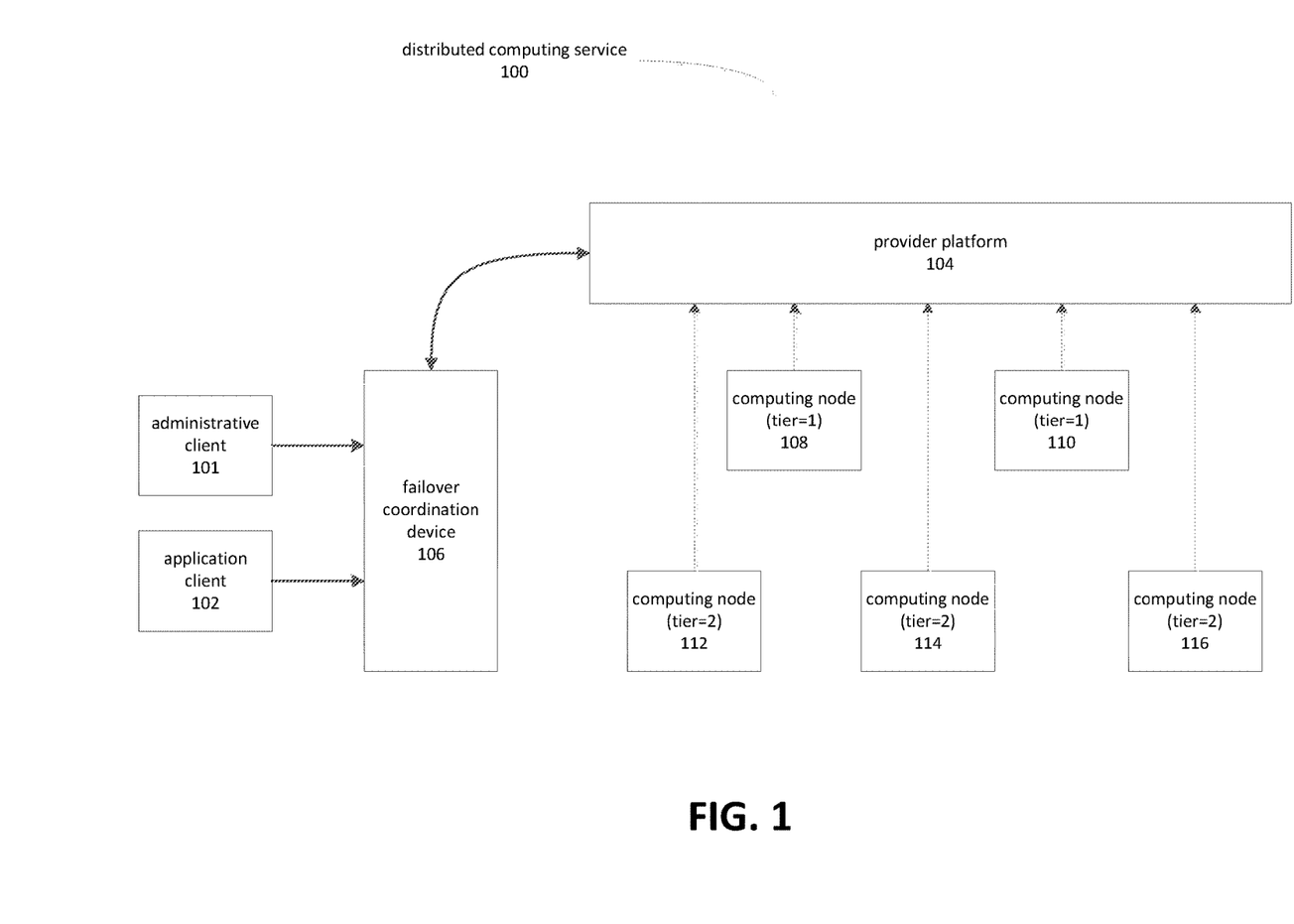
FIG. 1 is a block diagram depicting an example of a distributed computing service with designated promotion tiers.

FIG. 1 is a block diagram depicting an example of a distributed computing service 100 with tiered failover. The distributed computing service 100 may provide computing services to an application client 102 on behalf of an administrative client 101. The administrative client 101 may, for example, be a customer of the operator of the distributed computing service 100 while the application client 102 may be a customer of the operator of the administrative client 101. More generally, the administrative client 101 may interact with the distributed computing service 100 to configure provision of the computing services 100, while application client 100 may be a consumer of those services.

The distributed computing service 100 may provide computing services to the application client 102 by the operation of computing nodes 108-116. The computing nodes 108-116 may operate jointly to perform various computing functions, including those performed on behalf of the application client 102. For example, the computing nodes 108-116 may operate as a distributed database, such that requests to store data may be issued by the application client 102 and processed by one or more of the computing nodes 108-116. Similarly, requests to retrieve data may be issued by the application client 102 and processed by one or more of the computing nodes 108-116.

Certain of the computing nodes 108-116 may be configured to perform specialized functions. For example, some of the nodes 108, 110 might be configured to perform a "write" function, while other nodes 112-116 are configured to perform a "read" function. The respective configurations of these subsets of computing nodes may involve assigning the node to a particular function. In some instances, it may also involve specialized configuration of computing nodes in a subset. For example, the nodes 112-116 assigned to perform a "read" function might be configured with storage devices optimized for retrieving information, while the nodes 108, 110 assigned to perform a "write" function might be configured with storage devices optimized for storing information.

The distributed computing service 100 may provide increased reliability by providing support for failover. A computing node whose operating status has become unhealthy may, by the failover process, have its functions performed by another computing node. Ideally, when failover occurs, the computing node which assumes the duties of the failed computing node is as capable as the failed node. If not, the performance of the distributed system 100 may be further degraded. This situation may occur when the failed node and its replacement have dissimilar configurations. For example, if a node optimized for performing "write" operations is replaced by a node optimized for performing "read" operations, the performance of the replacement node may be less than that of the failed node.

A failover coordination device 106 may monitor the operating status of the computing nodes 108-116 and determine if a node should be failed-over. The determination may, for example, be based on a computing node having an unhealthy operating status, or by a request issued by the administrative client 101.

Having determined that a node is failing over, the failover coordination device 106 may determine which of the computing nodes 108-116 should be used as a replacement node. The determination made by the failover coordination device 106 may be multifaceted. The determination may, for example, take into consideration information supplied by the provider platform 104 and information provided by a customer of the provider platform 104 via the administrative client 101.

The administrative client 101 may provide identifiers establishing a soft priority for selecting computing nodes for promotion during a failover. Promotion, as used herein, refers to selection of a node to perform a computing function previously performed by a node that is failing over. The soft prior may be specified by associating each of the computing nodes 108-116 with an identifier, typically an integer number, which may be used to rank subsets of the computing nodes 108-116 with respect to each other. The rankings of the subsets may then be used, in combination with other factors, to identify a candidate for promotion.

For example, in FIG. 1 a first subset of computing nodes 108, 110 may be identified as promotion tier one, while a second subset of computing nodes 112-116 may be identified as promotion tier two. This information might be supplied by the administrative client 101 in the form of properties associating each node with an integer number. For example, computing nodes 108, 110 in the first subset might be associated with the integer value "1" while computing nodes 112-116 in the second subset might be associated with the integer value "2." Lower values may be associated with a higher priority for promotion, while higher values may be associated with a lower priority for promotion. This approach to identifying priority for promotion is intended to be illustrative, and should not be viewed as limiting the scope of the present disclosure to embodiments that identify priority of the nodes using this numeric ordering. For example, priority might be specified such as higher-valued integers are associated with higher priorities for promotion. Alternatively, priority might be specified through alphabetic or alphanumeric identifiers, with priority specified in either ascending or descending order.

Health status information may be monitored by the provider platform 104 and supplied to the failover coordination device 106. When a computing node enters an unhealthy operating state, the failover coordination device 106 may determine that the computing node should be failed over. The failover coordination device 106 may then select a second computing node to promote to the role that was, or is currently, being performed by the unhealthy node.

The selection of the node may proceed by identifying a highest priority for promotion, up to an including the promotion tier of the failing node. Accordingly, if a computing node 108 in the first promotion tier is to be rolled over, the failover coordination device 106 may first determine if a candidate for promotion is available within the first promotion tier. If not, the failover coordination device 106 may determine if a candidate is available in the second promotion tier, and so on. Whether or not a candidate is available within a promotion tier may depend on other factors, including but not limited to the role performed by a computing node.

Figure 2:
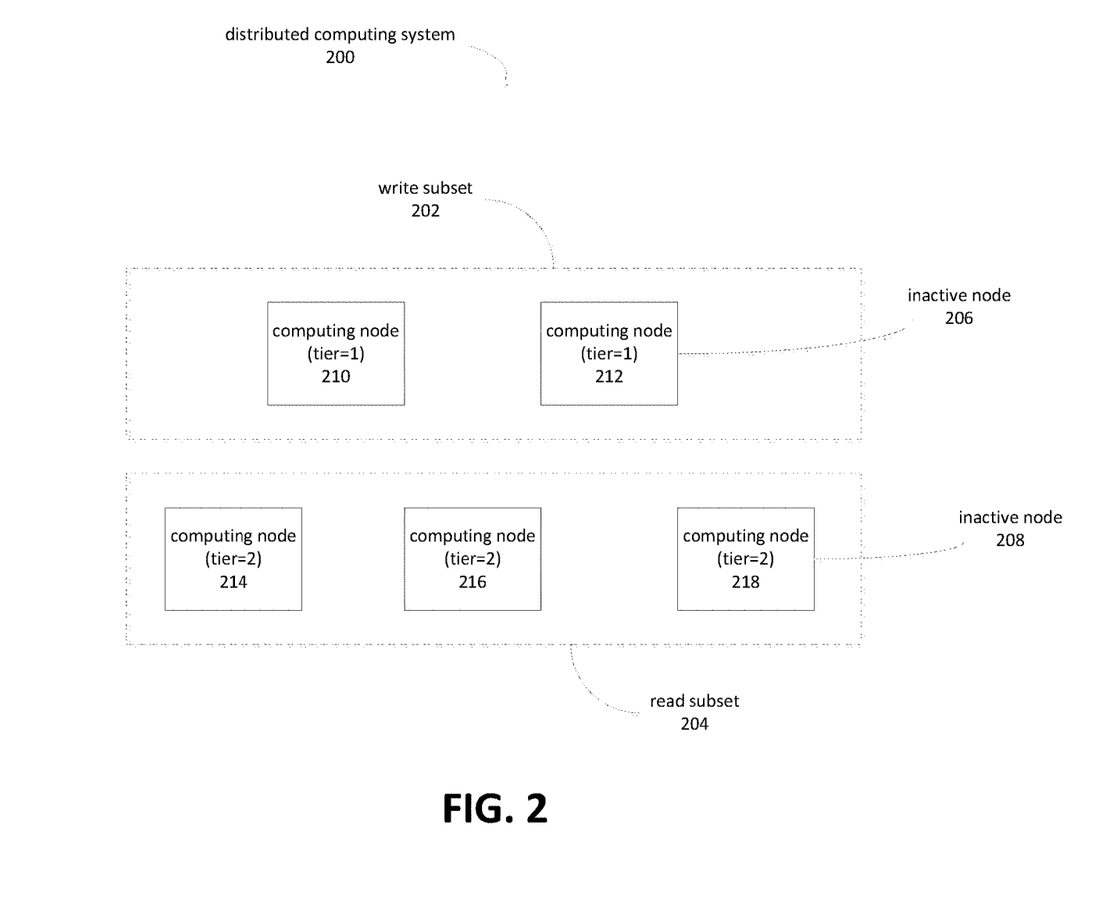
FIG. 2 is a block diagram depicting an example of roles performed by computing nodes in a distributed system.

FIG. 2 is a block diagram depicting an example of roles performed by computing nodes in a distributed system 200. The distributed system may, for example, be a distributed database comprising computing nodes 210-218.

The computing nodes 210-218 may comprise two subsets of nodes, a write subset 202 and a read subset 204. The write subset 202 may include nodes 210, 212 configured to perform "write" functions. A node 212 may be configured as an inactive node 206. This may improve availability of the node 212 to be available for promotion. In some instances, the node 212 may not be inactive but may be considered for promotion. The nodes 210, 212 may be configured to perform "write" operations, including optimizations directed to write performance.

The read subset 204 may include nodes 214-218. The read subset 204 may also contain an inactive node 208. The nodes 214-218 in the read subset 204 may be configured to perform read operations, and may be optimized for read performance.

An administrative client may provide data indicative of associations between the nodes 210-218 and promotion tiers. In the example of FIG. 2, the nodes 210, 212 in the write subset 202 are depicted as being associated with tier one, while the nodes 214-218 in the read subset 204 are depicted as being associated with tier two. Note that the depicted correlation between write subset 202 and computing nodes 210, 212 in tier one, and between read subset 204 and computing nodes 214-218 in tier two is related to two independent factors, namely the tier associations provided by the administrative client and the configurations of the computing nodes 210-218. The tier definitions are not a controlling factor regarding which subset a particular node is included in. In some instances, for example, nodes are assigned to write subset 202 and read subset 204 by the service provider, while the tier definitions are provided by the administrative client, or in other words assigned by the customer of the provider. However, the customer may consider the roles performed by the computing nodes 210-218 when determining which nodes will be assigned to which tier.

Figure 3:
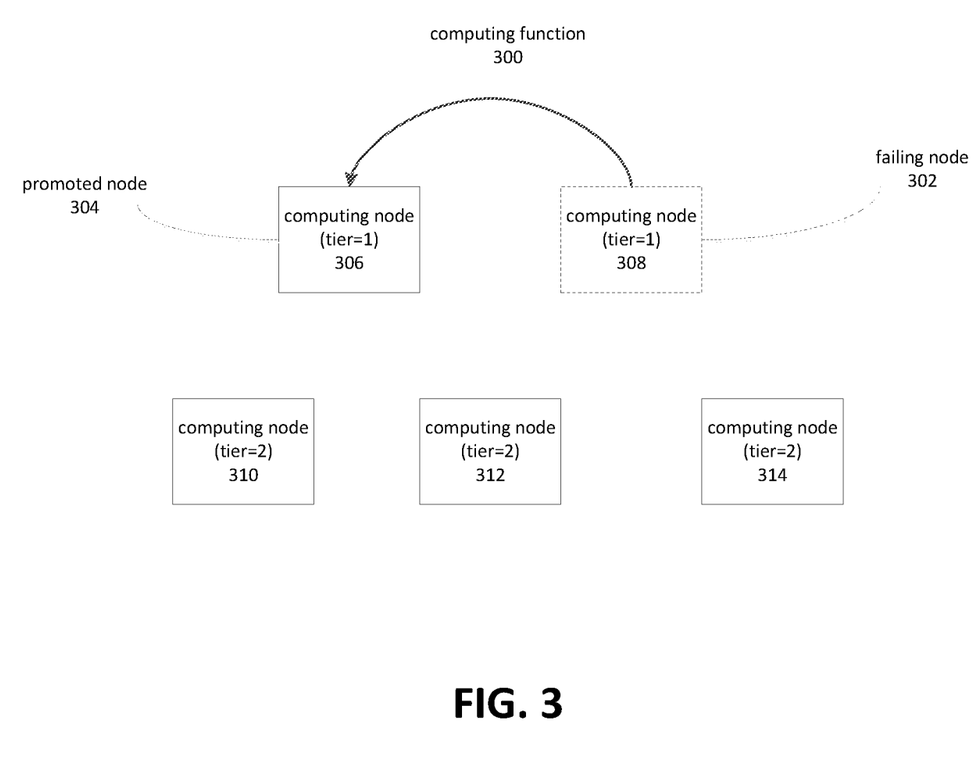
FIG. 3 is a block diagram depicting aspects of failover based on promotion tiers.

FIG. 3 is a block diagram depicting an aspect of failover based on a promotion tier. In FIG. 3, a first set of computing nodes 306, 308 has been associated with a first promotion tier and a second set of computing nodes 310-314 has been associated with a second promotion tier. For purposes of example, it may be assumed that a failing node 302 has been identified by a failover coordination device. The failover coordination device, based on this identification, may have determined to initiate a failover of the function(s) performed by the failing node 302 to another computing node.

The failover coordination device may identify nodes in the same tier as an initiate set of candidates for promotion. In some instances, nodes of the highest tier are examined first, followed by nodes of the second highest priority, and so forth, until a suitable node is found. The search for a candidate node may thus be described as proceeding in an order specified by the customer of the provider, based on criteria set and/or applied by the provider. The provider criteria may involve various factors. In some instances, the criteria may include the capacity of the candidate node to perform the function for which it is being promoted, or the capacity of the candidate node to continue to perform the role(s) it already is performing. Capacity may refer to innate capacity and/or to available capacity. The location of a candidate node may also be a criterion. For example, it may be desirable to favor nodes in the same geographic region as the failed node, or to exclude nodes in located in certain geographic regions. Similar principles may apply to criteria based on network location. The role of the candidate node prior to promotion may also be a factor.

The criteria may include the health of a candidate node, the function performed by the candidate node, the function the candidate node is to perform after promotion, and the presence of other nodes to perform functions of the distributed computing system.

In the example of FIG. 3, a computing node 306 of the first promotion tier may be considered as a candidate for promotion, and moreover determined to be available for promotion. This determination may be based on the computing node 306 being in a healthy operating status and not being fully occupied performing some other function. If this is the case, the computing node 306 may be promoted to perform the computing function 300 previously performed by the failing node 302. Since a node in the first tier is available, the failover coordination device does not select a candidate node from among the computing nodes 310-314 on the second tier.

Figure 4:
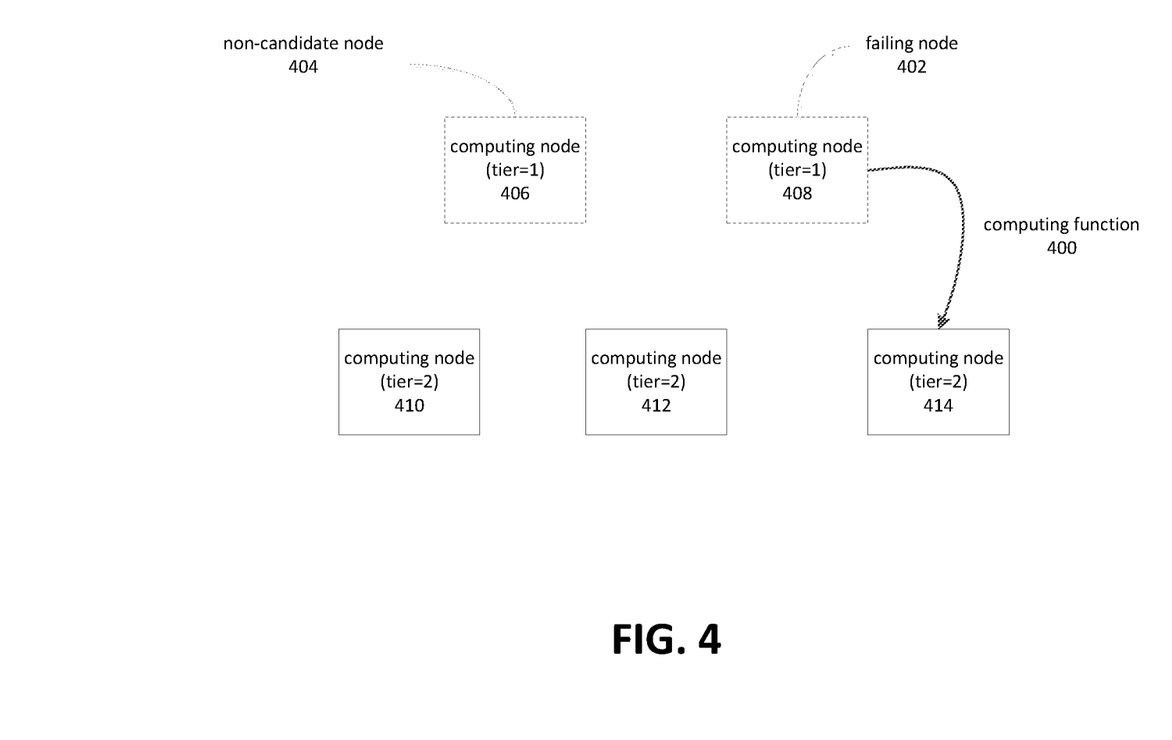
FIG. 4 is a block diagram depicting a further aspects of failover based on promotion tiers.

FIG. 4 is a block diagram depicting a further aspect of failover based on a promotion tier. For explanatory purposes, it may be assumed that a failing node 408 has been selected to be failed-over. A second computing node 406 in the same tier has been identified as a non-candidate node, and is thus not selected for promotion even though it is a member of the higher priority tier. Since no other node in tier one is available, the failover coordination device may identify candidate nodes from among the second tier of computing nodes 410-414.

The failover coordination device may then select computing node 414, from among the candidate nodes 410-414 in the second tier, to perform the computing function 400. The provider platform and failover coordination device may select from the candidates in a tier, or determine to not use any of the candidates in the tier, based on additional considerations such as the computing function 400, the configuration of a candidate node, the health and operating status of the node, and the computing function performed by the candidate node, particularly if performance of that function would be affected by also performing the failed-over computing function 400.

Computing nodes such as the non-candidate node 404 may be excluded as candidates based on various factors. These include an evaluation, performed by the failover coordination device, of the distributed system prior to and following the failover. For example, the failover configuration node may identify computing functions performed by each node of the distributed system, obtain performance metrics for the computing functions, and predict how the performance metrics would be affected by the failover. The failover coordination device may, in particular, determine that any essential functions of the computing nodes are adequately performed after the failover. For example, a distributed database system might comprise reader and writer nodes. The failover coordination device might ensure that, after the failover, at least one node is still dedicated to each function.

Figure 5:
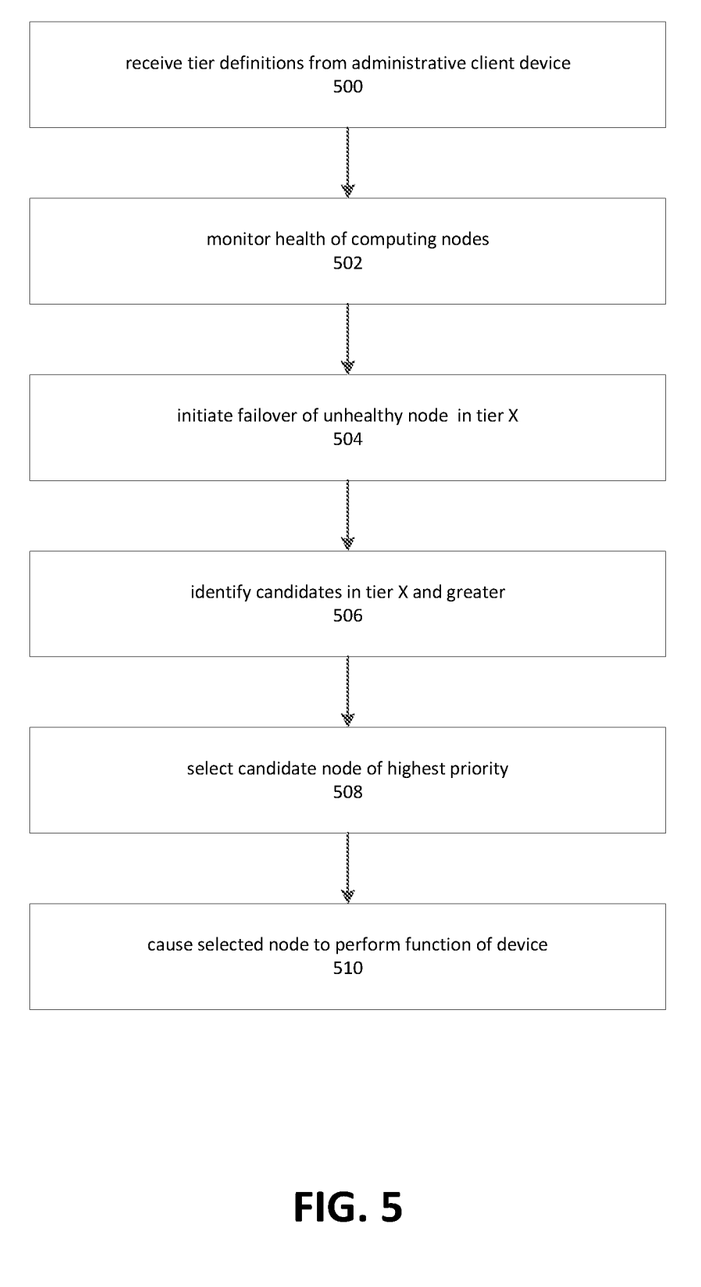
FIG. 5 is a flow diagram depicting an example of a process for selecting a promotion target.

FIG. 5 is a flow diagram depicting an example of a process for selecting a promotion target. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel. Embodiments of the depicted process may be implemented using various combinations of computer-executable instructions executed by a computing system, such as the computing systems described herein.

Block 500 depicts receiving tier definitions from an administrative client. The administrative client may comprise user interface elements for associating computing nodes with promotion tiers. In some instances, the user interface may provide controls permitting numeric identifiers to be associated with each node. The user interface might also include elements allowing for discovery and configuration of the computing functions typically performed by each node.

In an example, a failover service may provide information defining a user interface that may be used to associate computing nodes with identifiers indicative of the node's promotion order in the event of a failover. The information, which may be sent from the service to a client, may comprise hypertext transfer language ("HTML") data, extensible markup language ("XML") data, scripting code, and so on. For example, the information may comprise markup language and script that defines a user interface. The interface might comprise a list of computing nodes, in which each element of the list is accompanied by a drop-down menu that allows a promotion tier for the corresponding node to be selected. This example is intended to be illustrative, and thus should not be construed as limiting. In general, the interface may comprise various combinations of elements that allow a user to define associations between computing nodes and identifiers indicative of promotion order, i.e. promotion tier.

In another example, a failover service may provide application programming interface ("API") that clients may invoke. The API may permit the client to access a list of computing nodes to which identifiers may be assigned. An additional function of the API may permit the client to access or define a set of identifiers which may be associated with the computing nodes. The API may further permit the nodes to be associated with identifiers. For example, the service might provide an API function by, for example, exposing the API as a web service. Exposing the API may comprise sending information indicative of the API to a client.

The client might invoke the API function with various parameters. The parameters might, for example, include a list of computing nodes and, for each entry in the list, a corresponding identifier. The failover service may then use this information to establish the failover tiers. This example is intended to be illustrative, and thus should not be construed as limiting. In general, the API may include various functions or combination of functions that permit computing nodes to be associated with an identifier that is indicative of promotion order.

Block 502 depicts monitoring the health of computing nodes in a distributed system. A failover coordination device, such as a computing node with an installed failover coordination module, may receive information indicative of the health of the computing nodes in the system. The failover coordination device may monitor the information and determine when a node should be failed over. For example, a node that is no longer responsive might be selected for failover.

Block 504 depicts initiating failover of a computing node. The failover process may comprise steps to identify and evaluate candidates for promotion based on promotion tiers and provider-supplied criteria. Computing nodes may be evaluated according to a promotion-tier order. In some cases, the search may begin at the tier of the failed node. For example, the computing node may be identified as belonging to a tier which may, for illustrative purposes, be designated tier X. In other instances, the search for candidate nodes may begin at the highest possible priority tier, for example tier zero.

Starting with an initial tier—for the purposes of example assume X—the search may proceed in tiered order. Block 506 depicts identifying candidate notes for promotion, by looking first in tier X, followed by tier X+1, tier X+2, and so forth. The search may end as soon as a suitable candidate for promotion is found. Block 508 depicts selecting an appropriate candidate node, favoring first the candidate nodes in tier X, followed by those in tier X+1, then tier X+2, and so on. A computing node may be selected for promotion, and the search terminated, if the node meets provider criteria for promotion. Otherwise the search may continue.

When a computing node is selected for promotion, it may begin to perform one or more of the computing functions previously performed by the failed node. Block 510 depicts causing the selected candidate node to perform the computing function or functions previously performed by the failing computing node.

Figure 6:
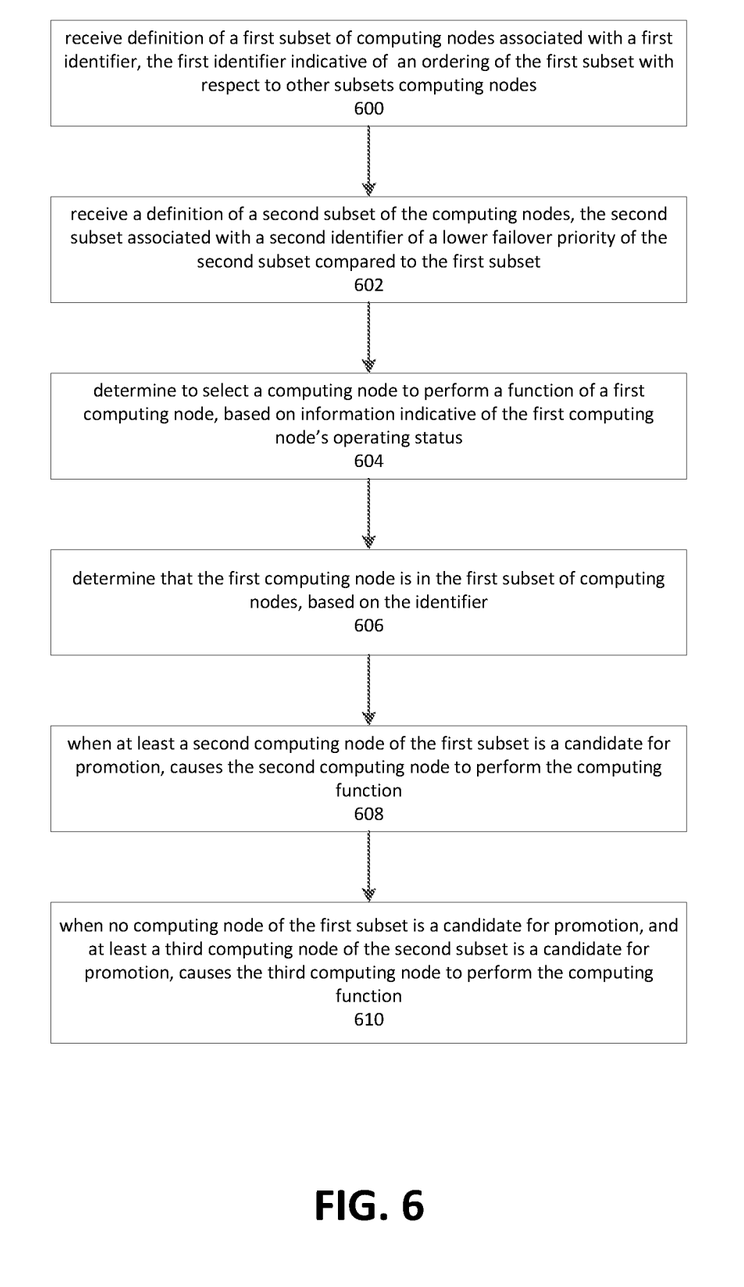
FIG. 6 is a flow diagram depicting an example of a failover process in a distributed computing service.

FIG. 6 is a flow diagram depicting an example of a failover process in a distributed computing service. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel. Embodiments of the depicted process may be implemented using various combinations of computer-executable instructions executed by a computing system, such as the computing systems described herein.

Block 600 depicts receiving a definition of a first subset of computing nodes. The definition may comprise associations between computing nodes and a first identifier. The computing nodes associated with the first identifier form the first subset of computing nodes. In addition to defining the subset of computing nodes, the identifier is also indicative of a priority of computing nodes in the first subset with respect to other subsets.

Block 602 depicts receiving a definition of a second subset of the computing nodes. The definition may comprise associations between computing nodes and a second identifier. The second identifier may be indicative of a lower priority than the first subset.

In an example, the definitions of the first and second subsets may be provided as a list of associations between computing nodes and identifiers. The list may comprise information pairs comprising an identifier of a computing node and an identifier.

In various instances, the client may align the associations along the lines of the functions performed by the computing nodes. For example, computing nodes associated with the first subset of computing nodes, i.e. a first tier, may perform a first computing function, while the second subset of computing nodes, i.e. a second tier, may perform a second computing function.

Block 604 depicts determining to select a computing node to perform a computing function being performed by a first computing node. In some cases, the determination is based on the first computing node being in an unhealthy operating status, such that it is no longer able to perform the computing function. In other cases, an administrative client may transmit a request to request that the computing function be failed-over from the first computing node to another computing node.

Block 606 depicts determining that the first computing node is a member of the first subset of computing nodes. The failover coordination device may make the determination by examination of the identifier associated with the first computing node.

Block 608 depicts that the failover coordination device may, when at least a second computing node of the first subset is a candidate for promotion, select the second computing node for performing the computing function. In some instances, a computing node of the first subset may be identified as a candidate based on a criteria specified by the provider. The provider may, for example, provide rules that act to override the tier definitions specified by the customer when certain conditions occur. For example, a computing node might be excluded as a candidate when a computing function it performs is not performed by any other node in the same tier, or any other node in the system. Conversely, a computing node might be considered a candidate when at least one other node in the same tier, or in the system, performs the same computing functions. These restrictions may be set by the provider so that the operation of the system is not adversely affected by the tier definitions provided by the client.

If the failover coordination device selects the second computing node, it may then cause the second computing node to perform the computing function previously performed by the first computing node.

Block 610 depicts that, when none of the computing nodes in the first subset are candidates for promotion, a third computing node in the second subset may be selected for promotion. If the failover coordination device selects the third computing node, it may then cause the third computing node to perform the computing function previously performed by the first computing node.

Figure 7:
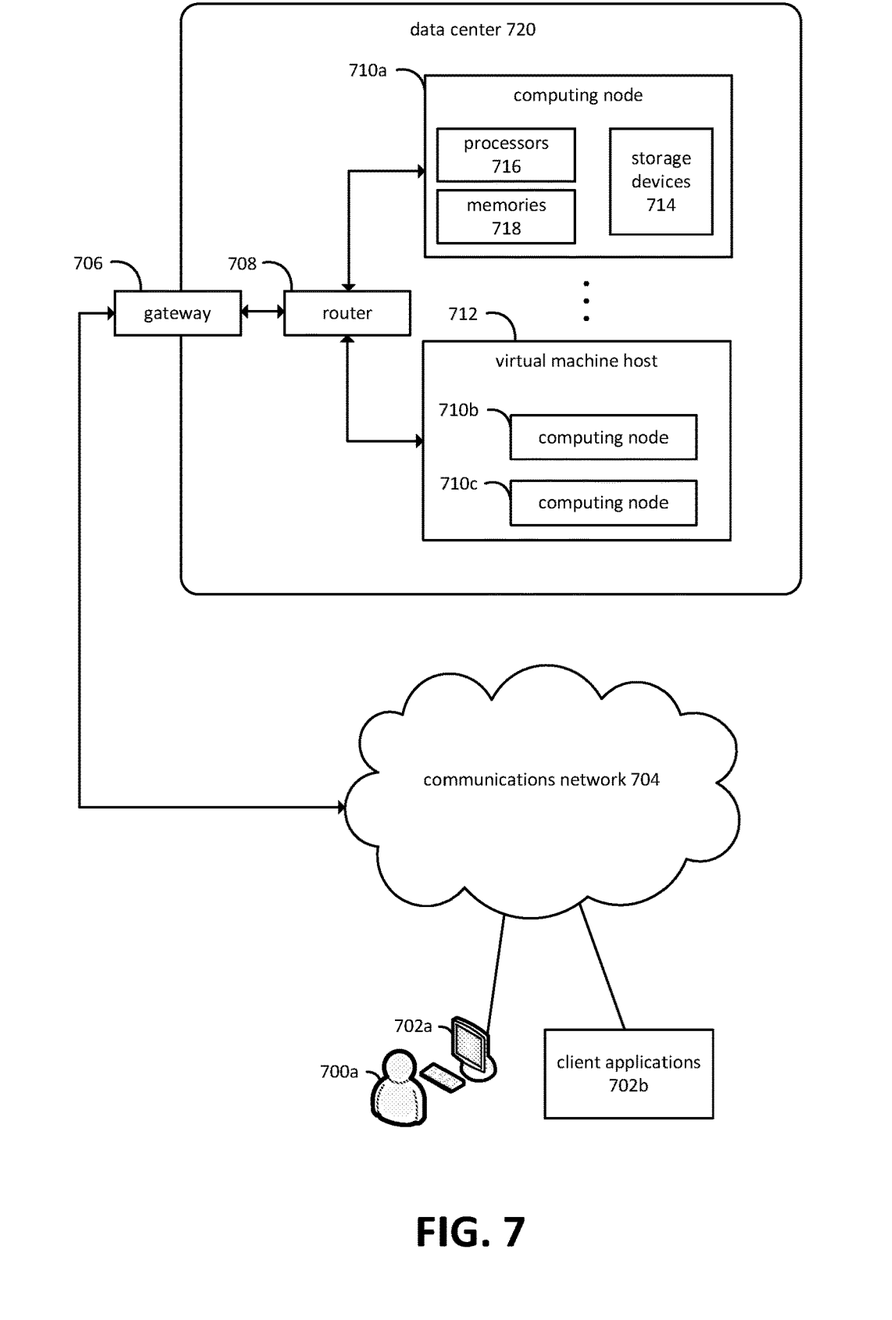
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 904 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 920 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718, and one or more storage devices 714. Processes on computing node 710a may execute in conjunction with an operating system or alternatively may execute as a bare-metal process that directly interacts with physical resources, such as processors 716, memories 718, or storage devices 714.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
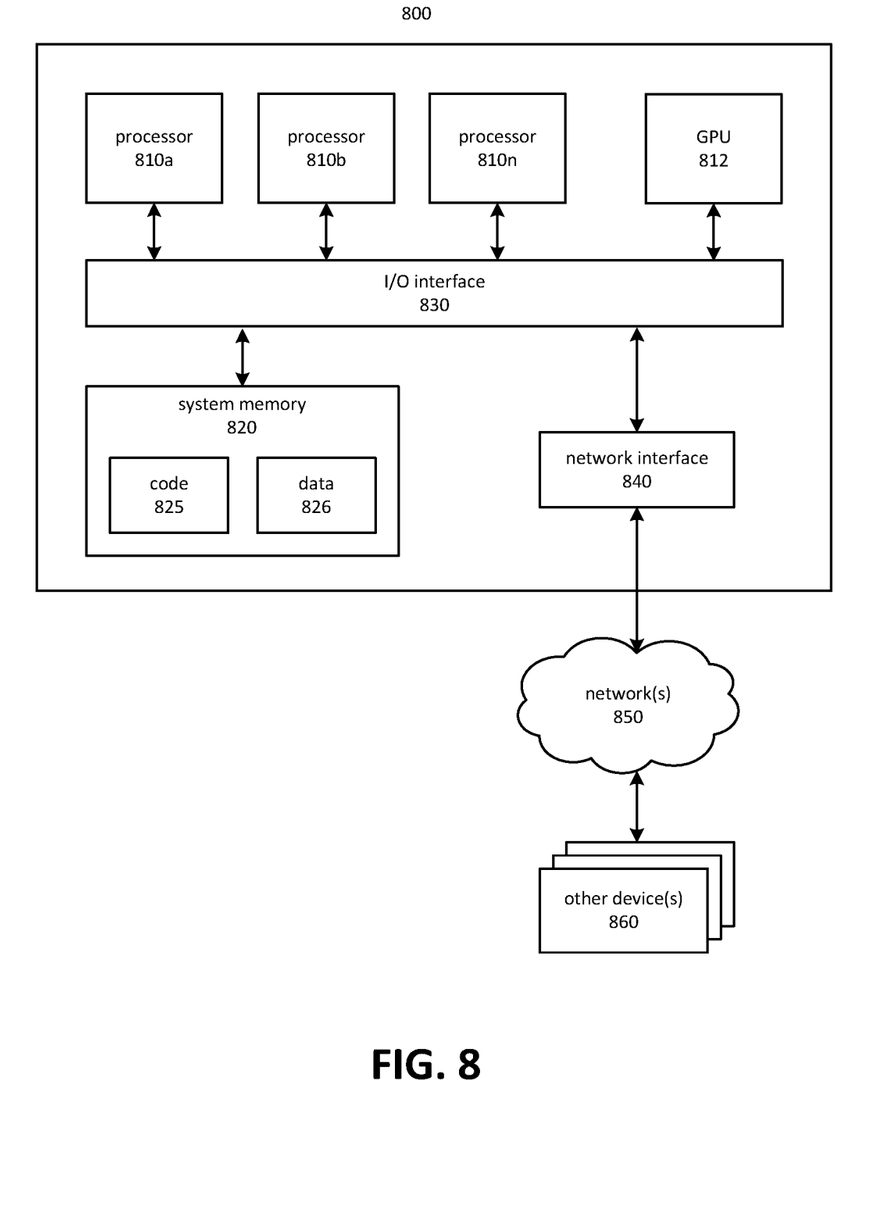
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b, and/or 810n (which may be referred herein singularly as a processor 1010 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/ or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   a plurality of computing nodes operable by a provider of a computing service to a client, the computing service comprising a first computing function; and
   a computing device that at least:
   sends, to the client, information indicative of an interface for associating one or more computing nodes, of the plurality of computing nodes, with one or more identifiers indicative of a promotion order for performing the first computing function in response to information indicative of an unhealthy operating status of another computing node that previously performed the first computing function;
   receives, from the client via the interface, information indicative of associations between a first subset of the plurality of computing nodes and a first identifier, the first identifier indicative of an ordering of the first subset with respect to other subsets of the plurality of computing nodes;
   receives, from the client via the interface, information indicative of associations between a second subset of the plurality of computing nodes and a second identifier, the second identifier indicative of a lower ordering of the second subset, with respect to other subsets of the plurality of computing nodes, than the first subset;
   determines to select a computing node, of the plurality of computing nodes, to perform the first computing function associated with a first computing node of the first subset, the determining based at least in part on information indicative of an unhealthy operating status of the first computing node;
   causes a second computing node of the first subset to perform the first computing function, based at least in part on the first identifier, when the second computing node is determined to be a candidate for performing the first computing function, the determination based at least in part on a criteria specified by the provider of the computing service, the criteria comprising at least one of capacity, location, or role of the second computing node; and
   causes a third computing node of the second subset to perform the first computing function, based at least in part on the second identifier, when no computing node of the first subset is a candidate for performing the first computing function and at least the third computing node of the second subset is a candidate for performing the first computing function.

2. The system of claim 1, wherein the computing device at least:
   receives, from the client, a list comprising the information indicative of associations between the first subset of the plurality of computing nodes and the first identifier, and the information indicative of associations between the second subset of the plurality of computing nodes and the second identifier.

3. The system of claim 1, wherein computing nodes of the first subset of the plurality of computing nodes perform the first computing function and computing nodes of the second subset of the plurality of computing nodes perform a second computing function.

4. The system of claim 1, wherein the criteria comprises a determination that an additional computing function performed by the second computing node is performed by at least one other computing node in the first subset.

5. A computer-implemented method comprising:
   providing an interface for associating one or more of a plurality of computing nodes with one or more identifiers indicative of an order of selecting one of the plurality of computing nodes for promotion to perform a computing function in response to information indicative of an unhealthy operating status of another computing node that previously performed the computing function;
   receiving, from an invocation of the interface, information indicative of an association between a first subset of the plurality of computing nodes and a first identifier, the plurality of computing nodes operated on behalf of a client by a provider;
   receiving information indicative of an association between a second subset of the plurality of computing nodes and a second identifier, the second identifier of a lower ordinal position than the first identifier;
   receiving information indicative of selecting a computing node, of the plurality of computing nodes, to perform a first computing function associated with a first computing node of the first subset;
   causing a second computing node of the first subset to perform the first computing function, based at least in part on the first identifier, when the second computing node of the first subset is a candidate for performing the first computing function; and
   causing a third computing node of the second subset to perform the first computing function, based at least in part on the second identifier, when no computing node of the first subset is a candidate for performing the first computing function, and the third computing node of the second subset is a candidate for performing the first computing function.

6. The computer-implemented method of claim 5, further comprising:
   determining that the second computing node is a candidate for performing the first computing function based at least in part on the second computing node having a healthy operating status.

7. The computer-implemented method of claim 5, further comprising:
    determining that the second computing node is a candidate for performing the first computing function based at least in part on a capacity of the second computing node to perform the first computing function.

8. The computer-implemented method of claim 5, further comprising:
    receiving information indicative of a plurality of identifiers, the plurality of identifiers comprising the first identifier and the second identifier, wherein each identifier of the plurality of identifiers corresponds to one of the plurality of computing nodes.

9. The computer-implemented method of claim 5, wherein computing nodes of the first subset of the plurality of computing nodes perform the first computing function and computing nodes of the second subset of the plurality of computing nodes perform a second computing function.

10. The computer-implemented method of claim 5, wherein the first identifier is a first integer value and the second identifier is a second integer value less than the first integer value.

11. The computer-implemented method of claim 5, further comprising:
    selecting the second computing node as a candidate for performing the first computing function, the selecting based at least in part on at least one of a geographic location or a network location of the second computing node.

12. The computer-implemented method of claim 5, wherein the second computing node is selected to perform the first computing function based at least in part on a role performed by the second computing node prior to failover.

13. A non-transitory computer-readable storage medium having stored thereon instructions that, upon execution by one or more computing devices, cause the one or more computing devices at least to:
    receive, by a client invocation of an interface for associating one or more computing nodes, of a plurality of computing nodes, with one or more identifiers indicative of a promotion tier to perform a computing function in response to information indicative of an unhealthy operating status of another computing node that previously performed the computing function, information indicative of an association between a first subset of the plurality of computing nodes and a first identifier, the plurality of computing nodes operated on behalf of a client by a provider;
    receive information indicative of an association between a second subset of the plurality of computing nodes and a second identifier, the second identifier of a lower ordinal position than the first identifier;
    determine to select a computing node, of the plurality of computing nodes, to perform a first computing function associated with a first computing node of the first subset;
    cause a second computing node of the first subset to perform the first computing function, based at least in part on the first identifier, when the second computing node of the first subset is a candidate for performing the first computing function; and
    cause a third computing node of the second subset to perform the first computing function, based at least in part on the second identifier, when no computing node of the first subset is a candidate for performing the first computing function, and the third computing node of the second subset is a candidate for performing the first computing function.

14. The non-transitory computer-readable storage medium of claim 13, further comprising instructions that, upon execution by the one or more computing devices, cause the one or more computing devices to at least:
    determine that the second computing node is a candidate for performing the first computing function based at least in part on the second computing node having a healthy operating status.

15. The non-transitory computer-readable storage medium of claim 13, further comprising instructions that, upon execution by the one or more computing devices, cause the one or more computing devices to at least:
    determine, when the third computing node is performing a second computing function, that the third computing node is a candidate for performing the first computing function based at least in part on at least an additional computing node of the second subset performing the second computing function.

16. The non-transitory computer-readable storage medium of claim 13, further comprising instructions that, upon execution by the one or more computing devices, cause the one or more computing devices to at least:
    determine that the second computing node is a candidate for performing the first computing function based at least in part on at least one of a capacity, location, or role of the second computing node.

17. The non-transitory computer-readable storage medium of claim 13, wherein computing nodes of the first subset of the plurality of computing nodes perform the first computing function and computing nodes of the second subset of the plurality of computing nodes perform a second computing function.

18. The non-transitory computer-readable storage medium of claim 13, wherein the first identifier is a first integer value and the second identifier is a second integer value less than the first integer value.

19. The non-transitory computer-readable storage medium of claim 13, wherein the information indicative of the association between the first subset of the plurality of computing nodes and the first identifier, and the information indicative of the association between the second subset of the plurality of computing nodes and the second identifier, is provided by the client of the provider.

20. The non-transitory computer-readable storage medium of claim 13, wherein the second computing node is selected to perform the first computing function based at least in part on a role performed by the second computing node prior to failover.

* * * * *